United States Patent
Asterjadhi et al.

(10) Patent No.: US 10,425,917 B2
(45) Date of Patent: Sep. 24, 2019

(54) LEGACY COMPATIBLE SIGNALING FOR CHANNEL BONDING

(71) Applicant: QUALCOMM Incorporated, San Diego, CA (US)

(72) Inventors: Alfred Asterjadhi, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 15/087,738

(22) Filed: Mar. 31, 2016

(65) Prior Publication Data

US 2016/0316455 A1    Oct. 27, 2016

Related U.S. Application Data

(60) Provisional application No. 62/150,597, filed on Apr. 21, 2015.

(51) Int. Cl.
| | |
|---|---|
| *H04W 72/04* | (2009.01) |
| *H04W 72/12* | (2009.01) |
| *H04W 74/08* | (2009.01) |
| *H04W 84/12* | (2009.01) |

(52) U.S. Cl.
CPC ....... *H04W 72/04* (2013.01); *H04W 72/0466* (2013.01); *H04W 72/121* (2013.01); *H04W 74/0816* (2013.01); *H04W 72/1289* (2013.01); *H04W 84/12* (2013.01)

(58) Field of Classification Search
CPC ............. H04W 72/04; H04W 72/0466; H04W 72/121; H04W 74/0816
See application file for complete search history.

(56) References Cited

U.S. PATENT DOCUMENTS

| | | | |
|---|---|---|---|
| 2008/0220788 A1* | 9/2008 | Stanwood | H04L 5/0007 455/450 |
| 2011/0075759 A1* | 3/2011 | Seok | H04W 80/02 375/295 |
| 2011/0096747 A1* | 4/2011 | Seok | H04W 72/04 370/329 |

(Continued)

OTHER PUBLICATIONS

Hart B., "DL-OFDMA for Mixed Clients, 11-10-0317-00-0 0ac-dl-ofdma-for-mixed-clients", IEEE Draft, 11-10-0317-00-00AC-DL-OFDMA-For-Mixed-Clients, IEEE-SA Mentor, Piscataway, NJ USA, vol. 802 .IIac, Mar. 13, 2010 (Mar. 13, 2010), pp. 1-24, XP017677328, [retrieved on Mar. 12, 2010] pp. 5,9 pp. 11,14.

(Continued)

*Primary Examiner* — Asad M Nawaz
*Assistant Examiner* — Syed Ali
(74) *Attorney, Agent, or Firm* — Patterson & Sheridan, L.L.P.

(57) ABSTRACT

Certain aspects of the present disclosure provide a method and apparatus for providing legacy compatible signaling for channel bonding. An example apparatus generally includes a processing system configured to generate a frame having channel bonding information indicating one or more channels available for multi-user (MU) communication by one or more wireless nodes and a first interface configured to output the frame for transmission.

30 Claims, 11 Drawing Sheets

(56) References Cited

U.S. PATENT DOCUMENTS

| | | | |
|---|---|---|---|
| 2012/0014336 A1* | 1/2012 | Seok | H04L 5/0007 370/329 |
| 2013/0286938 A1* | 10/2013 | Porat | H04L 27/2613 370/328 |
| 2014/0293983 A1 | 10/2014 | Amiri et al. | |
| 2015/0271002 A1* | 9/2015 | Oh | H04L 27/2626 370/329 |
| 2015/0373587 A1* | 12/2015 | Josiam | H04W 28/20 370/338 |
| 2016/0337906 A1* | 11/2016 | Cordeiro | H04W 72/0453 |
| 2017/0163391 A1* | 6/2017 | Kimura | H04W 16/14 |
| 2018/0007633 A1* | 1/2018 | Mori | H04M 1/00 |
| 2018/0020396 A1* | 1/2018 | Yoshimura | H04W 48/12 |
| 2018/0054810 A1* | 2/2018 | Shinohara | H04W 72/04 |
| 2018/0152953 A1* | 5/2018 | Park | H04W 72/12 |

OTHER PUBLICATIONS

International Search Report and Written Opinion—PCT/US2016/025611—ISA/EPO—dated Jun. 13, 2016.

Keiichi M., et al., "IEEE802.11af with Partial Subcarrier System for Effective Use of TV White Spaces", 2013 IEEE International Conference on Communications Workshops (ICC), IEEE, Jun. 9, 2013 (Jun. 9, 2013), pp. 1255-1259, XP032518622, DOI: 10.1109/ICCW.2013.6649429 [retrieved on Oct. 28, 2013] paragraph [00II], figure 1.

Stacey R., "Proposed TGac Draft Amendment", 11-1 0-1361-00-00ac-proposed-tgac-draft-amendment, IEEE Draft, 11-1 0-1361-00,00AC-P Roposed-TGAC, Draft-Amendment, IEEE-SA Mentor, Piscataway, NJ. USA, vol. 802.11ac, Nov. 10, 2010 (Nov. 10, 2010), XP017675820, pp. 1-130.

\* cited by examiner

LEGACY COMPATIBLE SIGNALING FOR CHANNEL BONDING

CLAIM OF PRIORITY UNDER 35 U.S.C. § 119

This application claims benefit of U.S. Provisional Patent Application Ser. No. 62/150,597, filed Apr. 21, 2015, which is herein incorporated by reference in its entirety

FIELD

Certain aspects of the present disclosure generally relate to wireless communications and, more particularly, to legacy compatible signaling for channel bonding.

BACKGROUND

In order to address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide an apparatus for wireless communications. The apparatus generally includes a processing system configured to generate a frame having channel bonding information indicating one or more channels available for multi-user (MU) communication by one or more wireless nodes and a first interface configured to output the frame for transmission.

Certain aspects of the present disclosure provide a method for wireless communications. The method generally includes generating a frame having channel bonding information indicating one or more channels available for multi-user (MU) communication by one or more wireless nodes and a first interface and outputting the frame for transmission.

Certain aspects of the present disclosure provide an apparatus for wireless communications. The apparatus generally includes means for generating a frame having channel bonding information indicating one or more channels available for multi-user (MU) communication by one or more wireless nodes and means for outputting the frame for transmission.

Certain aspects of the present disclosure provide computer readable medium for wireless communications. The computer readable medium generally includes instructions stored thereon for: generating a frame having channel bonding information indicating one or more channels available for multi-user (MU) communication by one or more wireless nodes and outputting the frame for transmission.

Certain aspects of the present disclosure provide an access point for wireless communications. The access point generally includes at least one antenna, a processing system configured to generate a frame having channel bonding information indicating one or more channels available for multi-user (MU) communication by one or more wireless nodes and a first interface configured to output the frame for transmission via the at least one antenna.

Certain aspects of the present disclosure provide an apparatus for wireless communications. The apparatus generally includes an first interface configured to obtain a frame comprising channel bonding information, a processing system configured to determine, based on the channel bonding information contained in the frame, one or more channels available for multi-user (MU) communication, and a second interface configured to output data for transmission on the one or more of the channels determined to be available for MU communication.

Certain aspects of the present disclosure provide an method for wireless communications. The method generally includes obtaining a frame comprising channel bonding information, determining, based on the channel bonding information contained in the frame, one or more channels available for multi-user (MU) communication, and outputting data for transmission on the one or more of the channels determined to be available for MU communication.

Certain aspects of the present disclosure provide an apparatus for wireless communications. The apparatus generally includes means for obtaining a frame comprising channel bonding information, means for determining, based on the channel bonding information contained in the frame, one or more channels available for multi-user (MU) communication, and means for outputting data for transmission on the one or more of the channels determined to be available for MU communication.

Certain aspects of the present disclosure provide a computer readable medium for wireless communications. The computer readable medium generally includes instructions stored thereon for obtaining a frame comprising channel bonding information, determining, based on the channel bonding information contained in the frame, one or more channels available for multi-user (MU) communication, and outputting data for transmission on the one or more of the channels determined to be available for MU communication.

Certain aspects of the present disclosure provide a wireless node for wireless communications. The wireless node generally includes at least one antenna, a first interface configured to obtain a frame comprising channel bonding information via the at least one antenna, a processing system configured to determine, based on the channel bonding information contained in the frame, one or more channels available for multi-user (MU) communication, and a second interface configured to output data for transmission via the at least one antenna on the one or more of the channels determined to be available for MU communication.

Aspects of the present disclosure also provide various methods, means, and computer program products corresponding to the apparatuses and operations described above.

DETAILED DESCRIPTION

Figure 1:
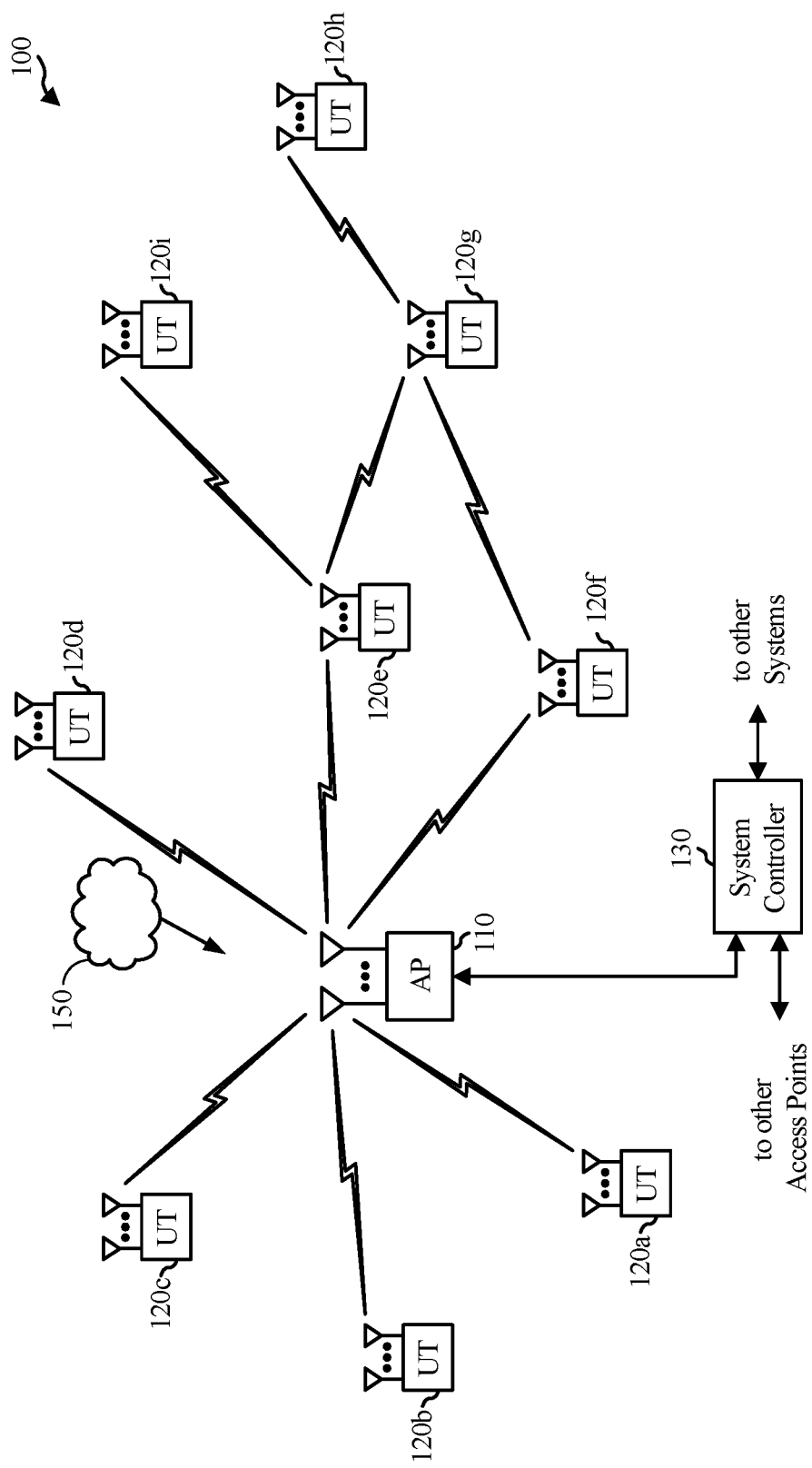
FIG. 1 is a diagram of an example wireless communications network, in accordance with certain aspects of the present disclosure.

Aspects of the present disclosure provide techniques for providing legacy compatible signaling for MU communication channel bonding by hiding information (e.g., channel bonding information) in a legacy frame that may be decodable by stations (STAs) supporting channel bonding (e.g., non-legacy STAs).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ If the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
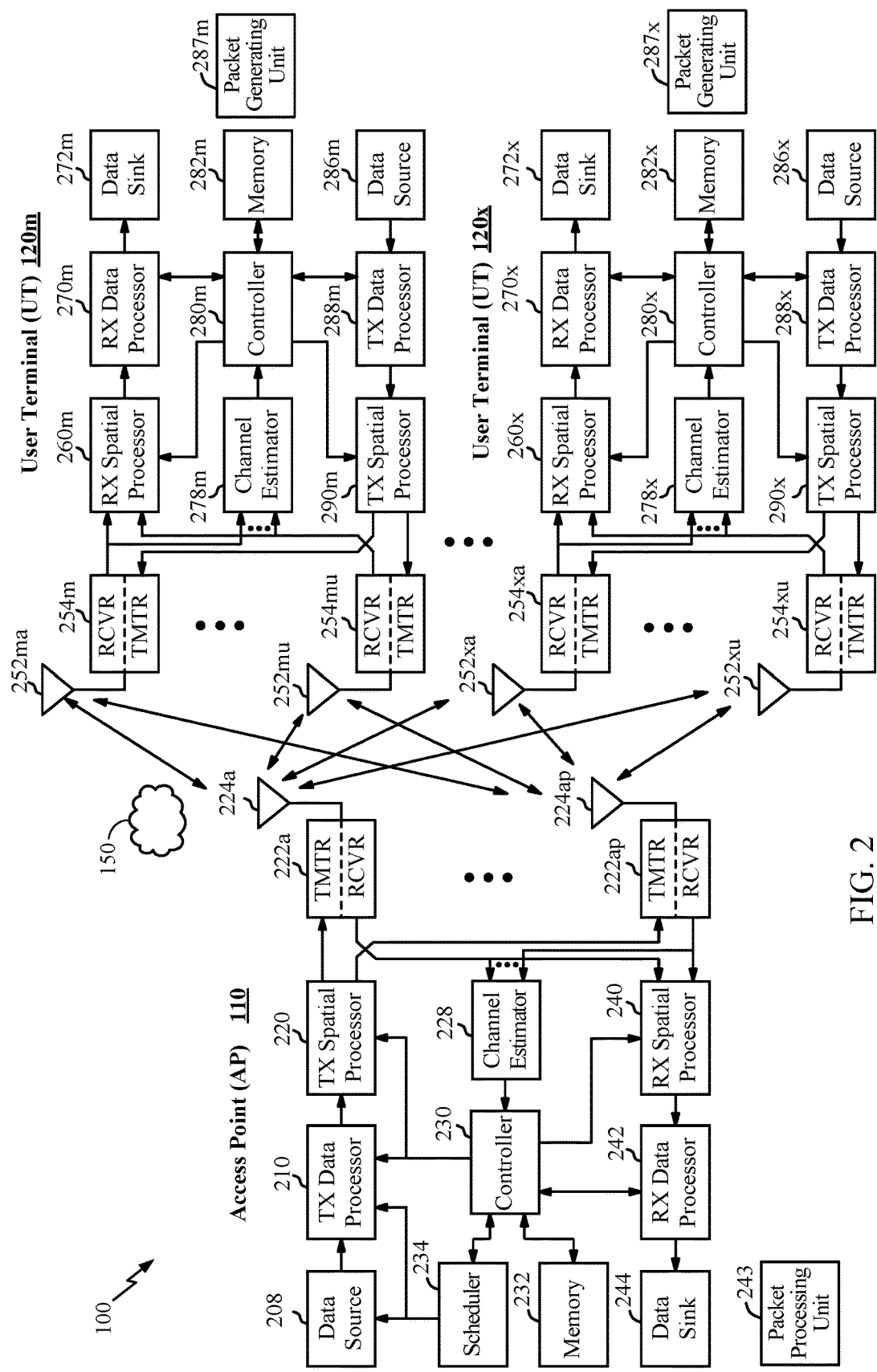
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{ap}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates.

Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
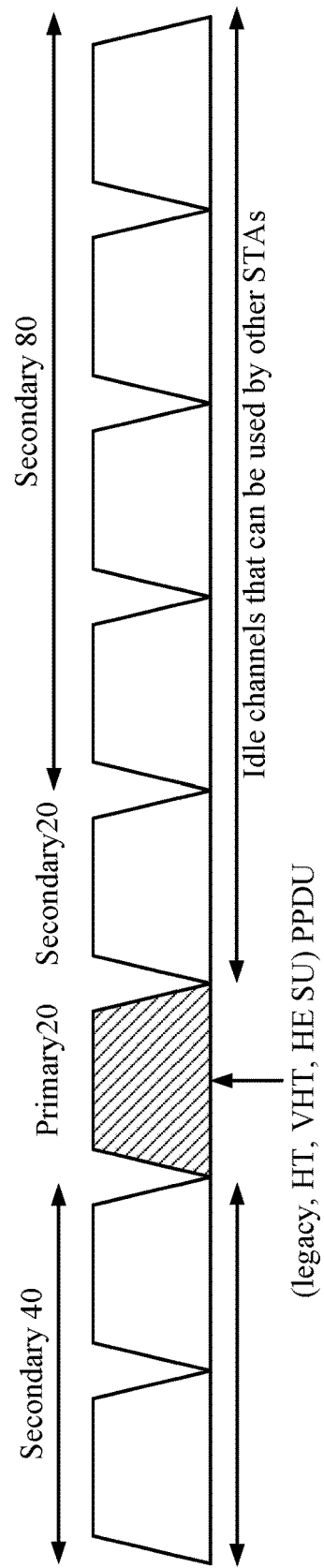
FIG. 3 illustrates various primary and secondary channel bandwidths in accordance with certain aspects of the present disclosure.
Figure 4:
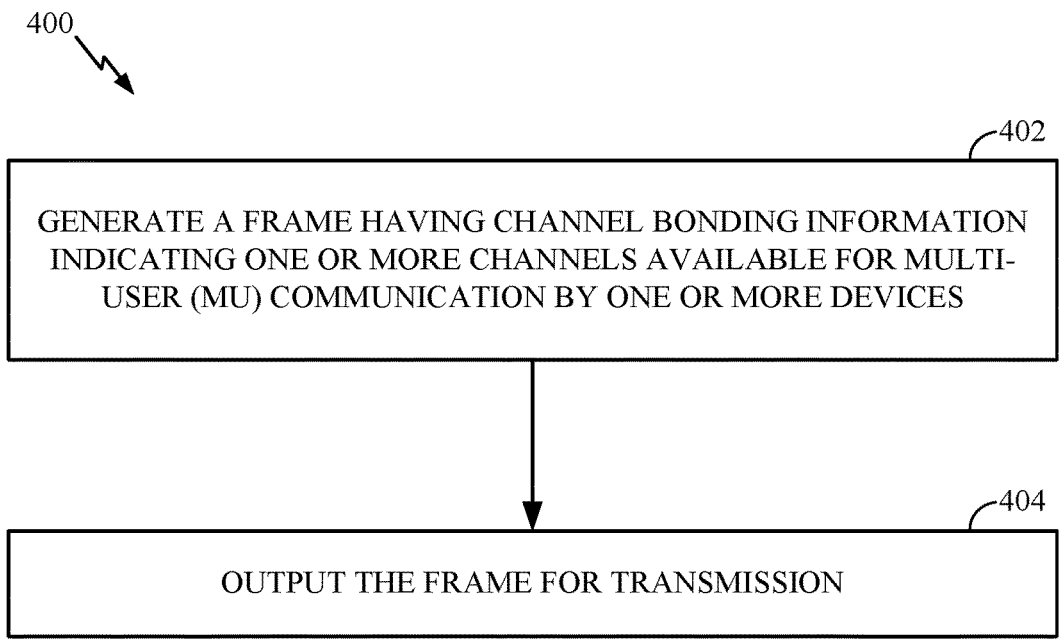
FIG. 4 illustrates example operations that may be performed by a wireless device in accordance with certain aspects of the present disclosure.

As illustrated, in FIGS. 1 and 2, one or more user terminals 120 may send one or more High Efficiency WLAN (HEW) packets 150, with a preamble format as described herein (e.g., in accordance with one of the example formats shown in FIGS. 3A-4), to the access point 110 as part of a UL MU-MIMO transmission, for example. Each HEW packet 150 may be transmitted on a set of one or more spatial streams (e.g., up to 4). For certain aspects, the preamble portion of the HEW packet 150 may include tone-interleaved LTFs, subband-based LTFs, or hybrid LTFs (e.g., in accordance with one of the example implementations illustrated in FIGS. 4-5 and 7).

The HEW packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the HEW packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a HEW packet 150 based on the IEEE 802.11 HEW standard, but may interpret a legacy packet (e.g., a packet complying with IEEE 802.11a/b/g) in a different manner, according to the standards amendment associated therewith.

Example Legacy Compatible Signaling for Channel Bonding

In certain networks (e.g., 802.11ax networks), the bandwidth of a basic service set (BSS) may be up to 160 MHz and may support multi-user transmissions aimed at increasing efficiency. In certain other networks, the bandwidth of the BSS may be any multiple of 20 MHz (e.g., 320 MHz, and so on). For example, a trigger frame may be used to solicit data from multiple stations in different sub channels in parallel, wherein a sub channel may be 20 MHz in width or consist of one or more portions (e.g., Resource Units) of the subchannel.

However, one problem that exists is that such networks often also support legacy stations (STAs) (e.g., 11a, 11n, 11ac, etc.), which always transmit in Single User (SU) mode and are not capable of supporting multi-user transmissions. In general, a legacy station is not capable of interpreting a new functionality, that other STAs in the network are capable of interpreting. For example, as illustrated in FIG. 3, when legacy packets are sent, multi-user transmissions may not be performed since there is no signaling for legacy STAs to support the multi-user transmissions. This may result in a loss of efficiency since when legacy STAs are transmitting, only the primary 20 MHz channel bandwidth can be used even though the secondary channels (e.g., 40 MHz, 80 MHz, and/or 160 MHz) are idle and could be used for transmitting to other STAs.

Thus, aspects of the present disclosure present techniques for legacy compatible signaling for channel bonding, which may enable a more efficient use of bandwidth (e.g., by enabling secondary channels to be used for delivering and receiving PPDUs to multiple STAs, while the primary channel is used by legacy STAs). More specifically, aspects of the present disclosure present techniques for enabling downlink (DL) and uplink (UL) multi-user channel allocation in a system supporting legacy and non-legacy (e.g., high-efficiency (HE)) STAs. In some cases, this may involve "hiding" information (e.g., channel bonding information) in a legacy frame that may enable HE STAs to transmit or receive on secondary channels in parallel with legacy STAs transmitting or receiving on the primary channel. According to certain aspects, the channel bonding information may be decodable by HE stations but may not be decodable by legacy stations.

FIG. 4 illustrates example operations 400 that may be performed by a device for providing legacy compatible signaling for channel bonding, in accordance with certain aspects of the present disclosure. Operations 400 may be performed by an apparatus, such as an access point (e.g., AP 110). Operations 400 may begin at 402, by generating a frame having channel bonding information indicating one or more channels available for multi-user (MU) communication by one or more wireless nodes. At 404, the apparatus may output the frame for transmission.

Figure 5:
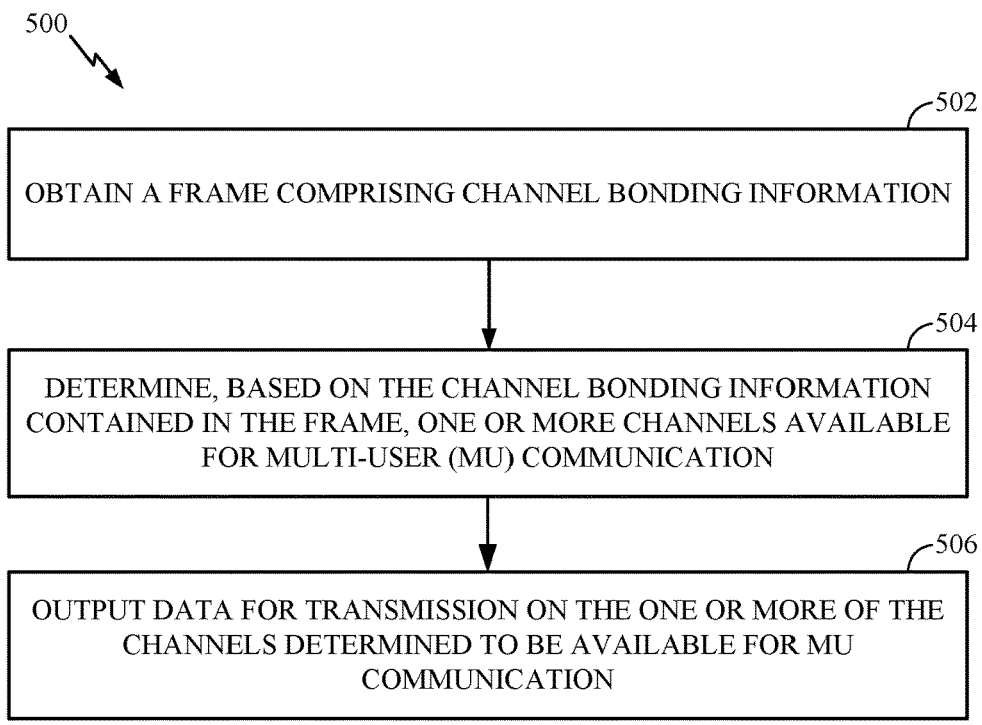
FIG. 5 illustrates example operations that may be performed by a wireless device in accordance with certain aspects of the present disclosure.

FIG. 5 illustrates example operations 500 that may be performed by a device for receiving legacy compatible signaling for channel bonding, in accordance with certain aspects of the present disclosure. Operations 500 may be performed by an apparatus, such as a wireless node/station (e.g., STA 120). Operations 500 may begin at 502, by obtaining a frame comprising channel bonding information. At 504, the wireless node determines, based on the channel bonding information contained in the frame, one or more channels available for multi-user (MU) transmissions. At 506, the wireless node outputs data for transmission on the one or more of the channels determined to be available for MU communication.

As noted above, signaling may be provided, by an access point, in a legacy frame that may enable HE STAs to transmit or receive on secondary channels in parallel with legacy STAs (i.e., STAs that do not support channel bonding) transmitting or receiving on the primary channel. The legacy compatible signaling may be provided in various ways. For example, one way to provide the legacy compatible signaling for channel bonding may be to provide the signaling in a Service field of a PHY Protocol Data Unit (PPDU).

Figure 6A:
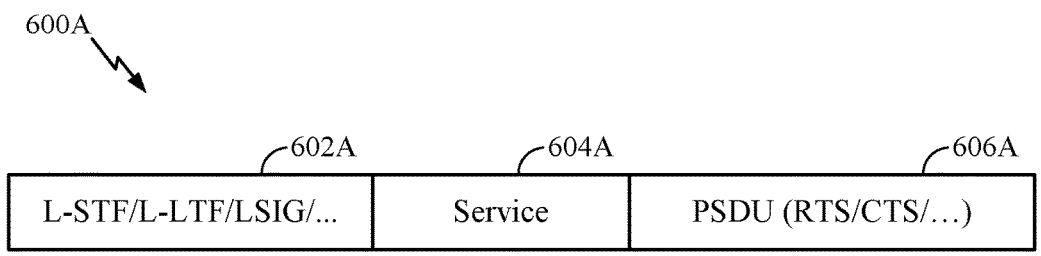
FIG. 6A illustrates an example Physical Layer Convergence Protocol (PLCP) Protocol data unit (PPDU) frame format, in accordance with certain aspects of the present disclosure.
Figure 6B:
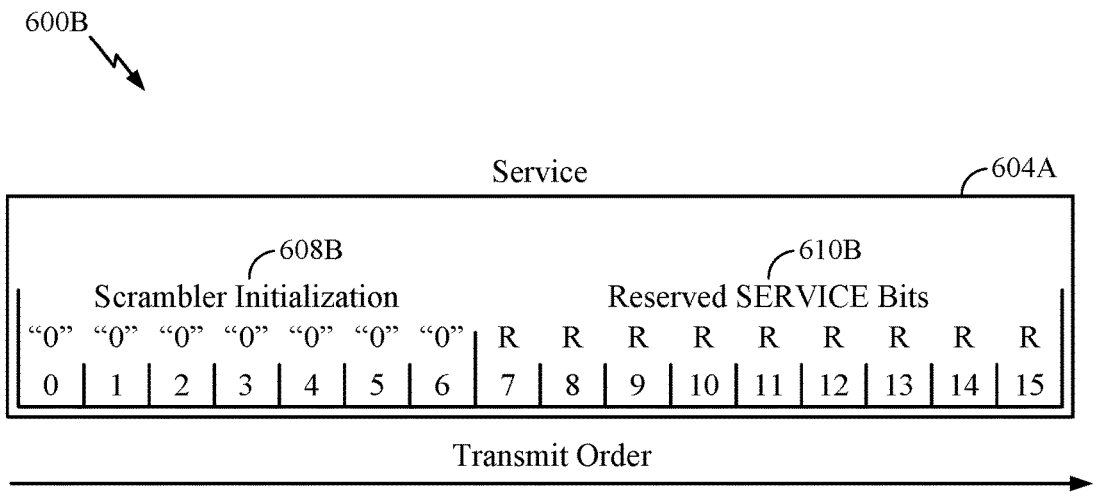
FIG. 6B illustrates an example service field format, in accordance with certain aspects of the present disclosure.

FIG. 6A illustrates a frame format for a PPDU 600A, in accordance with certain aspects of the present disclosure. As illustrated, the PPDU may comprise an L-STF/L-LTF/LSIG field 602A, a Service field 604A, and a PHY Service Data Unit 606A. Additionally, as illustrated in FIG. 6B, the Service field 604A may comprise 16 bits (e.g., bits 0-15), which may be split up into a Scrambler Initialization portion 608B (e.g., spanning bits 0-6) and a Reserved portion 610B (e.g., spanning bits 7-15).

According to certain aspects, the legacy compatible signaling for channel bonding may be provided in the Scrambler Initialization portion 608B and/or the Reserved portion 610B of the Service field 604A. Additionally, in some cases, one or more of the bits in the Reserved portion 610B of the Service field 604A may be used to protect the information carried in the Service field 604A. Further, bits B8-B15 may be set differently depending on a type of the PPDU 600A. For example, if the PPDU 600A comprises a high throughput (HT) PPDU, bits B8-B15 may be set to all 0s. Additionally, if the PPDU 600A comprises a very high throughput (VHT) PPDU, bits B8-B15 may comprise a SIG-B cyclic redundancy check (CRC).

According to certain aspects, the legacy compatible signaling for channel bonding may comprise a list of idle channels (e.g., a channel index, CH_IDX) that may be used for multi-user UL/DL transmissions in parallel with legacy transmissions (e.g., 11a, 11n, 11ac, and/or HE single user transmissions). In some cases, a list of multi-user STAs that are allowed to access the idle channels may be provided by the AP in advance to the list of idle channels.

Figure 7A:
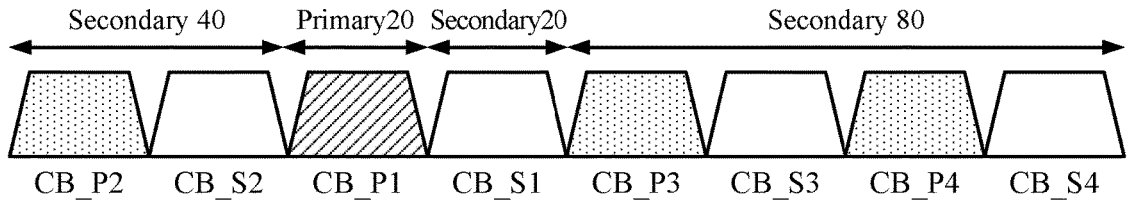
FIG. 7A illustrates various primary and secondary channel bandwidths allocations, in accordance with certain aspects of the present disclosure.
Figure 7B:
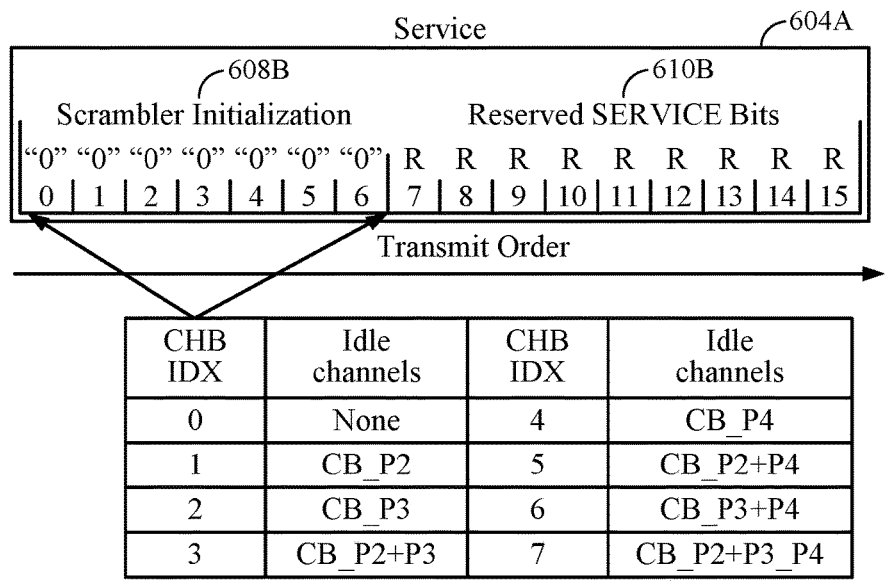
FIG. 7B illustrates an example channel index mapping for a scrambler initialization portion of a service field, in accordance with certain aspects of the present disclosure.

FIGS. 7A and 7B illustrate an example mapping of the secondary idle channel bandwidths to bits in the scrambler initialization portion 608B of the Service field. For example, FIG. 7A illustrates a secondary 40 MHz channel bandwidth that may comprise a primary channel bandwidth, CB_P2, and a corresponding secondary channel bandwidth, CB_S2. Additionally, as illustrated, a secondary 80 MHz channel bandwidth may comprise primary channel bandwidths, CB_P3 and CB_P4, and corresponding secondary channel bandwidths, CB_S3 and CB_S4.

As illustrated in FIG. 7B, the idle channel bandwidths listed in the channel index, CHB IDX, may be indicated using a combination of three or more bits of the scrambler initialization portion 608B of the Service field 604A. For example, a value of 0 (i.e., 000) may indicate that no secondary channels are idle while a value of 6 (i.e., 110) may indicate that primary channels CB_P3 and CB_P4 of the secondary 80 MHz channel bandwidth are idle. While FIG. 7B illustrates one mapping of bit values to idle channels, it should be understood that other mappings may exist.

According to certain aspects, contiguous channel bonding may be supported using the secondary idle channels illustrated in FIG. 7A. For example, as illustrated, there may be three channels which are eligible for channel bonding (e.g., CB_P2, CB_P3, and CB_P4) and once a primary channel is selected (e.g., CB_P2) by a STA for transmission, the AP may also inform the STA that the STA may expand its transmission over the corresponding secondary channel (e.g., CB_S2). According to certain aspects, if contiguous channel bonding is supported the bandwidth of transmissions may be up to 40 MHz, while if contiguous channel bonding is not supported, the bandwidth of the transmissions may only be 20 MHz on the idle secondary channels.

According to certain aspects, the mapping illustrated in FIGS. 7A and 7B assumes a basic service set (BSS) bandwidth of 160 MHz. However, when the BSS bandwidth is lower, the number of bits needed to indicate the idle channels may be less (e.g., 2 bits instead of 3). Thus, the left over bit may be used for scrambling. For example, when the BSS bandwidth is 80 MHz, the most significant bit may be assigned to the scrambler. Additionally, the left over bit may be used for providing better resolution. For example, when the BSS bandwidth is 80 MHz, each bit can indicate a status of each 20 MHz channel.

As noted above, another way to provide legacy compatible signaling for channel boding, may be to indicate a list of idle channels in the reserved portion of the Service field.

Figure 7C:
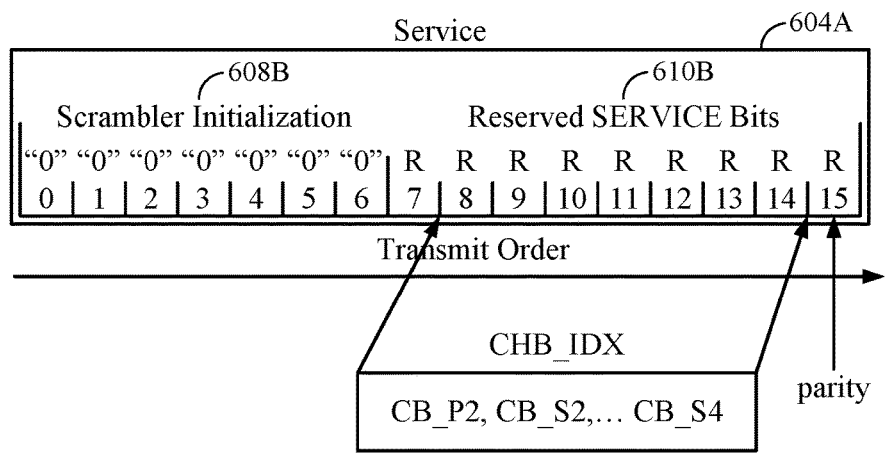
FIG. 7C illustrates an example bitmap for a reserved portion of a service field, in accordance with certain aspects of the present disclosure.

For example, as illustrated in FIG. 7C, a bitmap of 7 bits may be provided in which each bit of the bitmap may indicate a different idle channel (e.g., CB_P2, CB_S2, CB_P3, CB_S3, etc., as illustrated in FIG. 7A) that may be available for channel bonding. Additionally, one bit in the reserved portion of the service field may be used as a parity bit to protect (e.g., used for checking for errors) the 7-bit bitmap sequence. According to certain aspects, the bandwidth of transmissions may be 20 MHz for this option. Additionally, according to certain aspects, this option may inherit request to send (RTS)/clear to send (CTS) bandwidth signaling from 802.11ac and may maintain 1 bit (in an RTS) and 2 bits (in a CTS) for scrambling.

According to certain aspects, an HE AP may define one or more "alternate temporary primary channels" (e.g., the secondary idle channel bandwidths illustrated in FIG. 7A). In some cases, the AP may allocate (or pre-allocate, meaning allocated before the actual availability of the channels is signaled) each of its HE STAs a different alternate temporary primary channel.

Figure 8:
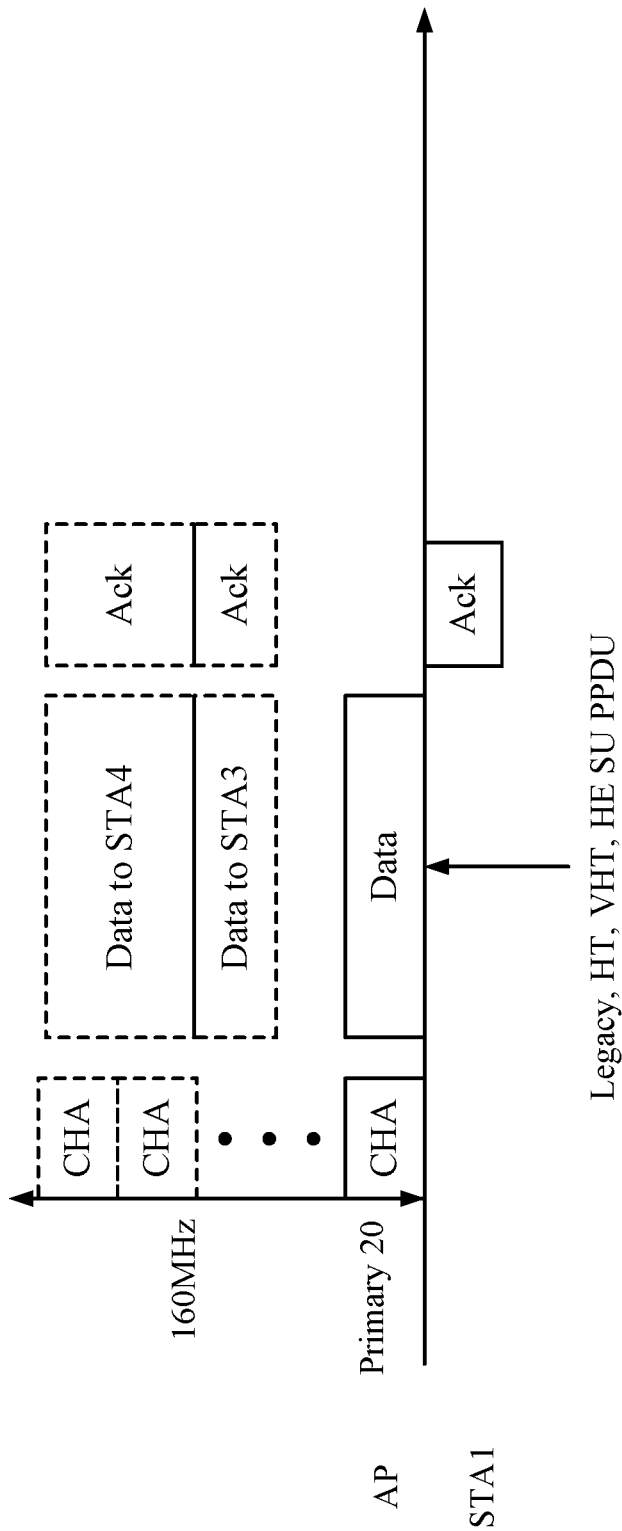
FIG. 8 illustrates an example timeline of downlink (DL) channel bonding signaling, in accordance with certain aspects of the present disclosure.

FIG. 8 illustrates that, according to certain aspects, at some point before a (legacy data) transmission with limited bandwidth, the AP may send a channel allocation (CHA) frame (e.g., a data frame, RTS frame, CTS frame, etc.), comprising legacy compatible signaling (e.g., channel bonding information) for channel bonding, notifying HE STAs of a possible simultaneous HE transmission (i.e., MU transmissions) on the alternate temporary primary channels. In some cases, the channel bonding information in the CHA frame may comprise at least one bit indicating whether or not one or more of the allocated channels are available for MU communication. In some cases, the at least one bit may comprise a plurality of bits corresponding to the one or more channels, each bit indicating whether or not the corresponding one or more channels are available for MU communication.

According to certain aspects, and which will be described in greater detail below, the HE AP may transmit the channel allocation frame to a legacy STA which may receive the channel allocation in a primary channel (e.g., the 20 MHz primary channel), as illustrated in FIG. 8. The channel allocation frame may also be received by other HE STAs which, upon receiving the channel allocation frame, may switch and wait for (HE) PPDUs in the alternate temporary primary channels indicated in the channel allocation frame. According to certain aspects, the HE STAs may stay on the alternate temporary primary channel for a time indicated in the channel allocation frame or for a predefined time negotiated outside of the channel allocation frame.

Figure 9:
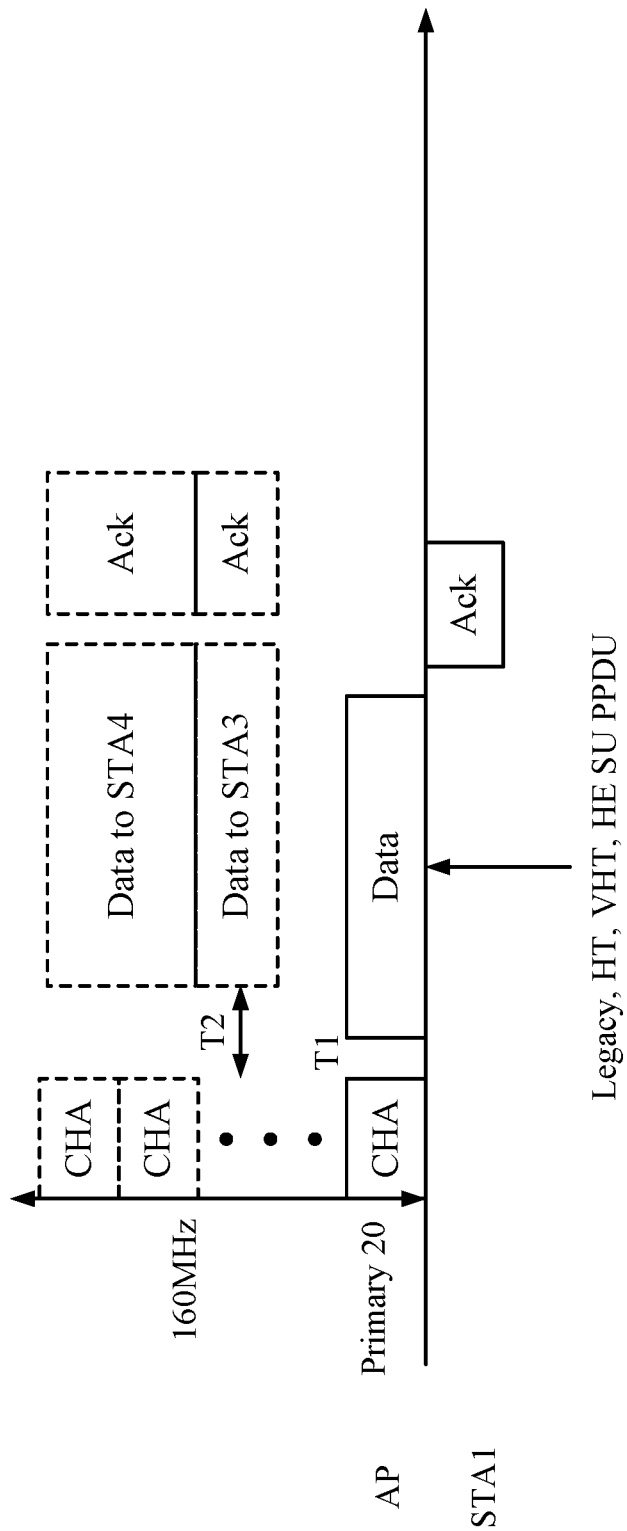
FIG. 9 illustrates that a time after which PPDU transmissions on alternate temporary primary channels is initiated may be longer than a time at which transmission on a primary channel is initiated, in accordance with certain aspects of the present disclosure.

FIG. 9 illustrates that the time after which PPDU transmissions on the alternate temporary primary channels is initiated may be longer than the time at which the transmission on the primary channel is initiated. For example, FIG. 9 illustrates that the time at which PPDUs are transmitted on the primary (e.g., 20 MHz) channel, T1, may be SIFS time after transmission of the channel allocation frame, whereas the time at which PPDUs are transmitted on the alternate temporary primary channels, T2, may be PIFS time after transmission of the channel allocation frame. According to certain aspects, transmitting on the alternate temporary primary channels at a later time than on the primary channel may avoid ambiguities during the detection of the bandwidth of the PPDU transmission sent on the primary channel.

Figure 10:
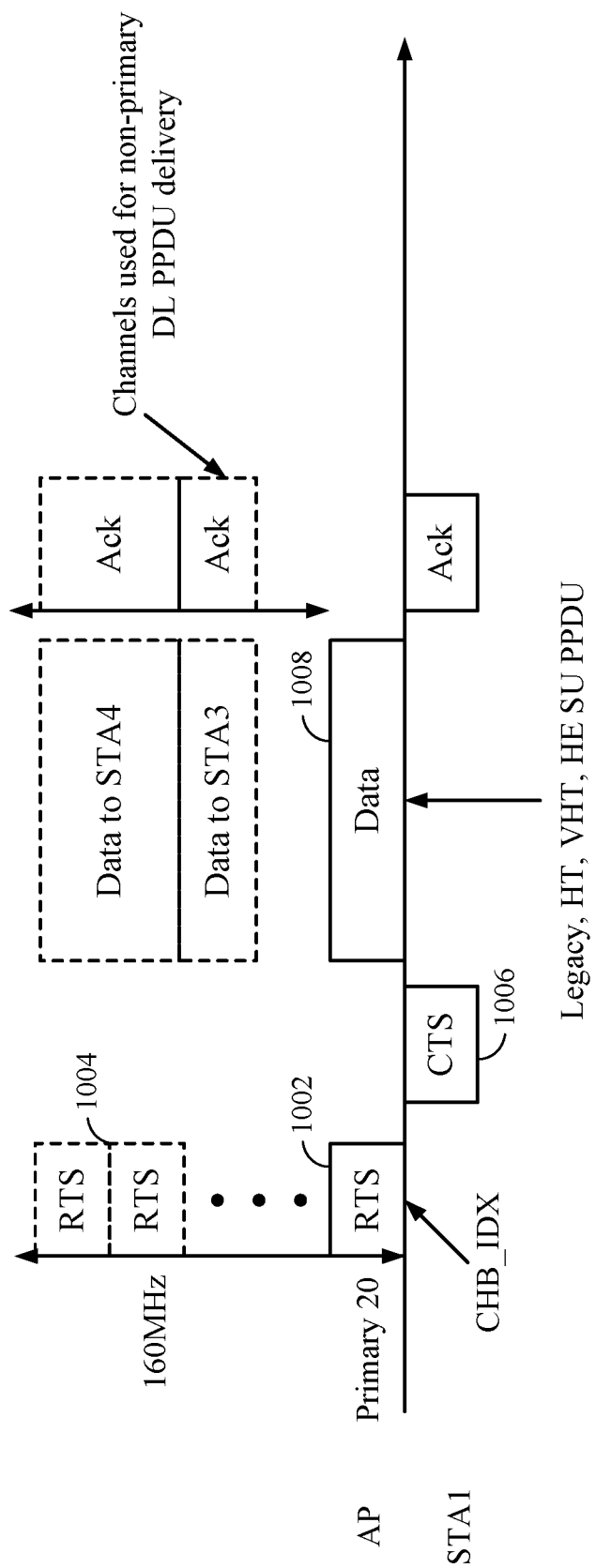
FIG. 10 illustrates an example timeline of channel bonding signaling for downlink (DL) PPDUs, in accordance with certain aspects of the present disclosure.

FIG. 10 illustrates a timeline of providing legacy compatible signaling for channel boding for DL PPDUs, in which the channel allocation frame, as described above, comprises an RTS frame. For example, as illustrated, an HE AP may transmit an RTS frame 1002 to legacy STA1 on the primary 20 MHz channel, initiating (or during) a legacy transmission opportunity (TXOP). According to certain aspects, the Service field of the RTS frame 1002 may comprise a list of channels (e.g., the CHB_IDX, as described above) that are idle and available for channel bonding. As noted above, the bandwidth/channel bonding signaling may be provided in a scrambler initialization portion or a reserved portion of the service field. Additionally, in some cases, the RTS frame may be duplicated (e.g., if the AP is capable, it may transmit "enhanced" RTS frames 1004 to non-legacy STAs 3 and 4).

As illustrated in FIG. 10, upon reception of the RTS frame 1002 from the AP, STA1 may respond with a CTS frame 1006, indicating that the primary channel is idle. Additionally, non-intended receivers that are capable of channel bonding (e.g., channel bonding (CB) STAs 3 and 4) may receive the RTS frame 1002 and determine the list of idle channels (i.e., CHB_IDX). For example, the CB STAs may check if their pre-allocated channel bonding channel is included in the list of idle channels. If the CB STA determines that one of its pre-allocated channel bonding channels is in the idle channel list, the CB STA may synchronize to one or more of the pre-allocated channel bonding channels to receive DL buffer units (BUs) (i.e., downlink data). According to certain aspects, the CB STA may have 2*Short Interface Space (SIFS)+CTSTxTime to synchronize. In some cases, a full duplex mode may be supported in which the CB STAs may be able to transmit UL BUs while the AP is transmitting DL BUs to the STAs not supporting channel bonding.

As illustrated in FIG. 10, the channel bonding STA may then receive DL BUs 1008 from the AP in the allocated channel bonding channels in parallel with data delivery to legacy STA1. The STAs may then transmit acknowledgements (ACKs) in their allocated channel bandwidths.

As noted above, channel bonding STAs may receive an RTS frame 1002 intended for a legacy station and may determine if a pre-allocated channel bonding channel is included within a list of idle channels in the RTS frame. However, the CB STAs scheduled to receive DL BUs during a legacy TXOP need to know which of the channels in CB_IDX list (i.e., the list of idle channels) are pre-allocated for their DL BUs.

According to certain aspects, an AP may provide STAs with an indication of an assignment of pre-allocated channels in various ways. For example, an AP may deliver the pre-allocated channels assignment information in a beacon that precedes the beacon interval (BI) during which the RTS with CB signaling (i.e., the list of idle channels) is sent. According to certain aspects, more than one CB STA may be specified for a given CB channel and the indication may be valid for one BI.

According to certain aspects, the AP may deliver the pre-allocated channels assignment information in a target wake time (TWT) element that precedes a TWT service period (SP) during which the RTS with CB signaling is sent. Similarly, more than one CB TWT STA may be specified for a given CB channel and the indication may be valid for one or more TWT SPs.

According to certain aspects, the AP may deliver the pre-allocated channels assignment information in a frame that is sent to the CB STA(s) prior to the RTS frame with CB signaling. For example, the AP may send a Trigger to the CB STA(s) at a time of SIFS or more prior to transmitting the RTS frame. The indication may be valid for a pre-defined amount of time, which may be negotiated or specified in the frame itself.

Additionally, in some cases, the AP may deliver the allocated channels assignment information in the channel allocation frame (e.g., an RTS and/or CTS frame) itself, which may be valid for a pre-defined amount of time.

Figure 11:
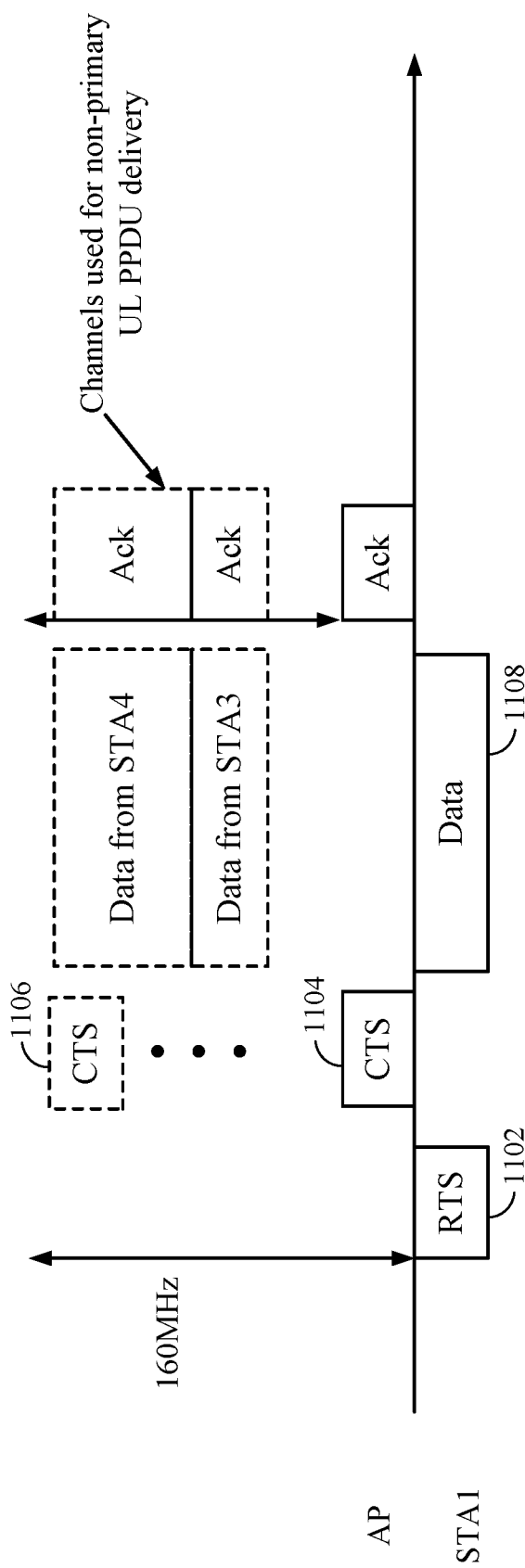
FIG. 11 illustrates an example timeline of channel bonding signaling for uplink (UL) PPDUs, in accordance with certain aspects of the present disclosure.

FIG. 11 illustrates a timeline of providing legacy compatible signaling for channel boding for UL PPDUs, in which the channel allocation frame, as described above, comprises CTS frame. For example, a legacy STA (e.g., STA1) may transmit an RTS 1102 to an HE AP. Upon reception of the RTS frame 1102, the HE AP may transmit a CTS frame 1104 to STA1 during a legacy TXOP. According to certain aspects, the Service field of the CTS frame 1104 may comprise a list of channels (e.g., CHB_IDX) that are idle and available for channel bonding. As noted above, the bandwidth/channel bonding signaling may be provided in a scrambler initialization portion or a reserved portion of the service field. Additionally, in some cases, the CTS frame 1104 may be duplicated (e.g., if the AP is capable, it may transmit "enhanced" CTS frames 1106 to CB STAs 3 and 4). In some cases, the AP may also transmit a CTS frame as a CTS-to-self for STA1.

According to certain aspects, upon reception of the CTS frame, STA1 may respond with data (i.e., UL BUs) 1108. Additionally, non-intended receivers that are capable of channel bonding (e.g., channel bonding (CB) STAs 3 and 4) may receive the CTS frame 1104 and determine the list of idle channels (i.e., CHB_IDX). For example, the CB STAs may check if their pre-allocated channel bonding channel is included in the list of idle channels. If the CB STA determines that one of its pre-allocated channel bonding channels is in the idle channel list, the CB STA may synchronize to one or more of the pre-allocated channel bonding channels to transmit UL buffer units (BUs). In some cases, the CBs may be able to randomly select one of the idle channels to transmit on. The CB STAs may then transmit data (i.e., UL BUs) on their indicated CB channels either after SIFS, staggered in time, or, if the medium was idle PIFS, before the CTS, as illustrated in FIG. 11.

According to certain aspects, in some cases, a full duplex mode may be supported in which the CB STAs may be able to receive DL BUs from the AP while the AP is receiving UL BUs from the STAs not supporting channel bonding.

As noted above, CB STAs may receive an CTS frame intended for a legacy station and may determine if a pre-allocated channel bonding channel is included within a list of idle channels in the CTS frame. However, the CB STAs scheduled to transmit UL BUs during a legacy TXOP need to know which of the channels in CB_IDX list (i.e., the list of idle channels) are pre-allocated for their UL BUs. Knowing the allocated channels may be particularly important if the access in the CB channels is done SIFS time any only be one CB STA (i.e., without contention).

According to certain aspects, the AP may deliver the information about the allocation of CB channels in a Beacon preceding the beacon interval (BI) during which CTS with CB signaling is sent. According to certain aspects, more than one CB STA can be specified for a given CB channel and the indication may be valid for one BI. Additionally, this option may be available when CB STAs are allowed to contend for the CB channel.

According to certain aspects, the AP may deliver the information about the allocation of CB channels in a TWT element that precedes a TWT SP during which the CTS with CB signaling is sent. Similarly, more than one CB TWT STA may be specified for a given CB channel and the indication may be valid for one or more TWT SPs.

According to certain aspects, the AP may deliver the information about the allocation of CB channels in a frame that is sent to the CB STA(s) prior to the CTS frame with CB signaling. For example, the AP may send a Trigger to the CB STA(s) at a time of SIFS or more prior to transmitting the CTS frame. The indication may be valid for a pre-defined amount of time, which may be negotiated or specified in the frame itself.

According to certain aspects, the information about the allocation of CB channels may also include an indication of whether the allocated CB channel is assigned for DL or UL. In some cases, the information about whether the CB channel is assigned for DL or UL may be indicated in the Service field of the RTS frame and/or the CTS frame which includes the indication about which secondary channels are idle.

Figure 4A:
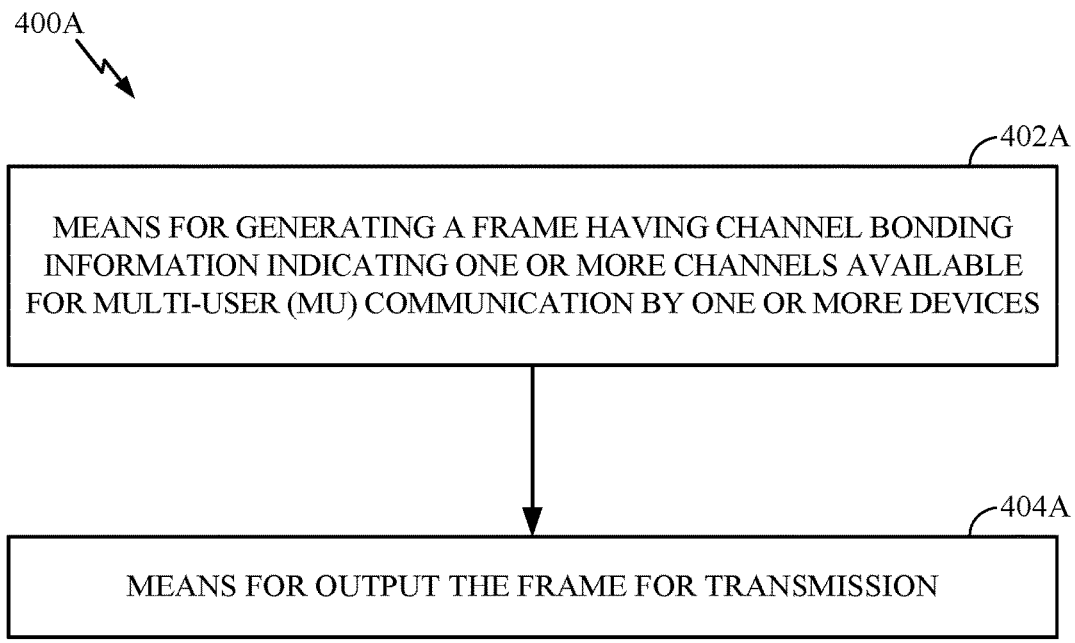
FIG. 4A illustrates example means capable of performing the operations illustrated in FIG. 4.
Figure 5A:
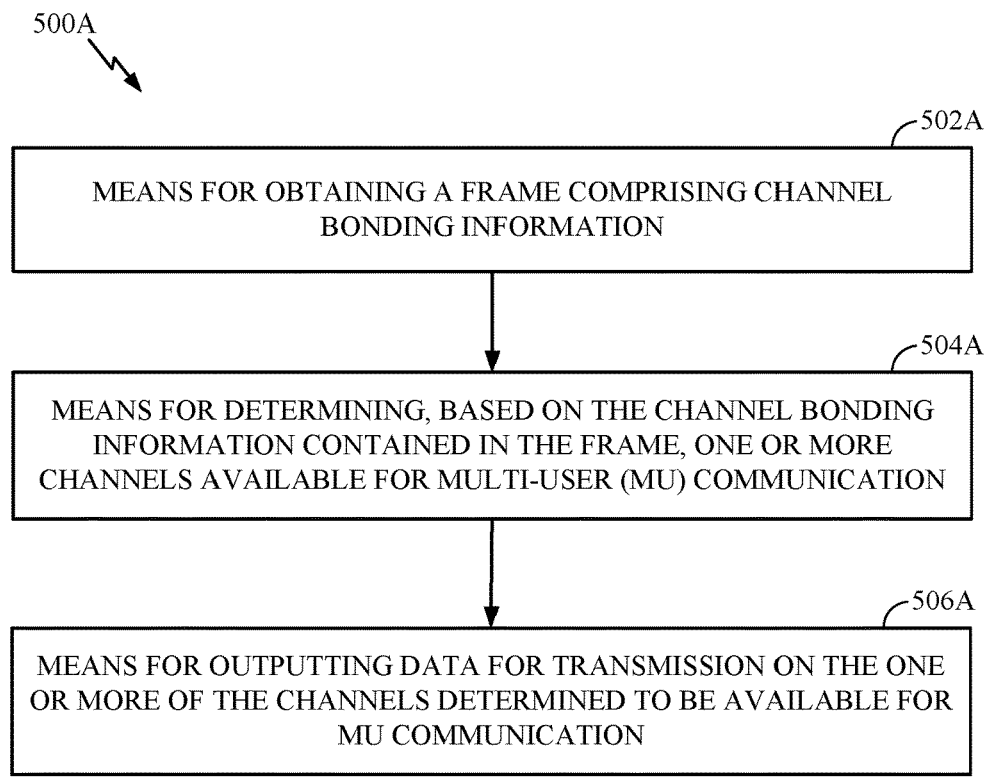
FIG. 5A illustrates example means capable of performing the operations illustrated in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4 correspond to means 400A illustrated in FIG. 4A. Additionally, operations 500 illustrated in FIG. 5 correspond to means 500A illustrated in FIG. 5A.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 254 of the user terminal 120 illustrated in FIG. 2. Means for processing, means for generating, means for performing frequency offset adjustment, means for determining, means for using (e.g., means for using one or more bits of a service field), and/or means for providing may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
at least one processor configured to:
generate a frame including a service field, the service field including channel bonding information, the channel bonding information indicating whether each of a plurality of channels are available for multi-user (MU) communication by a plurality of wireless nodes of a first type, the plurality of wireless nodes of the first type having a first MU communication capability, wherein:
a plurality of bits of the service field are used by the apparatus for scrambler initialization;
the frame is decodable by the plurality of wireless nodes of the first type and one or more wireless nodes of a second type, the one or more wireless nodes of the second type not having the first MU communication capability;
the channel bonding information is interpretable by the plurality of wireless nodes of the first type but not interpretable by the one or more wireless nodes of the second type;
the channel bonding information comprises one or more bits, wherein different values of the one or more bits map to different combinations of channels of the plurality of channels available for MU communication by the plurality of wireless nodes of the first type; and
a number of bits in the one or more bits is based, at least in part, on a channel bandwidth; and
output the frame for transmission; and
a memory coupled with the at least one processor.

2. The apparatus of claim 1, wherein:
each bit of the one or more bits of the channel bonding information corresponds to one or more of the plurality of channels; and
each bit indicates whether or not the corresponding one or more channels are available for the MU communication.

3. The apparatus of claim 1, wherein the frame comprises a request to send (RTS) or a clear to send (CTS) frame.

4. The apparatus of claim 1, wherein the channel bonding information comprises a bitmap, wherein each bit in the bitmap indicates whether a corresponding channel is available for MU communication.

5. The apparatus of claim 1, wherein the at least one processor is further configured to:
obtain a request from another apparatus; and
generate the frame having the channel bonding information after obtaining the request.

6. The apparatus of claim 1, wherein the at least one processor is further configured to:
obtain data transmitted on one or more channels of the plurality of channels indicated as available for MU communication by the channel bonding information.

7. The apparatus of claim 6, wherein the at least one processor is further configured to: obtain the data transmitted on the one or more channels from multiple wireless nodes.

8. The apparatus of claim 1, wherein the at least one processor is further configured to provide an indication of an assignment of the plurality of channels to the one or more wireless nodes.

9. The apparatus of claim 8, wherein the indication is provided in at least one of a beacon, a target wakeup time (TWT) element, or the frame.

10. The apparatus of claim 8, wherein the indication is valid for an amount of time.

11. The apparatus of claim 1, wherein the at least one processor is further configured to output data to be transmitted on one or more channels of the plurality of channels indicated as available for MU transmissions by the channel bonding information.

12. The apparatus of claim 1, further comprising a transmitter configured to transmit the frame, wherein the apparatus is configured as an access point.

13. The apparatus of claim 1, wherein the first MU communication capability comprises a downlink MU communication capability.

14. The apparatus of claim 1, wherein the first MU communication capability comprises an uplink MU communication capability.

15. The apparatus of claim 1, wherein the first MU communication capability comprises an Orthogonal Frequency-Divisional Multiple Access (OFDMA) communication capability.

16. The apparatus of claim 1, wherein the first MU communication capability comprises a multiple-input, multiple-output (MIMO) communication capability.

17. An apparatus for wireless communications, comprising:
at least one processor configured to:
obtain a frame including a service field, the service field including channel bonding information, the channel bonding information indicating whether each of a plurality of channels are available for multi-user (MU) communication by a plurality of wireless nodes of a first type, the plurality of wireless nodes of the first type having a first MU communication capability, the plurality of wireless nodes of the first type including the apparatus, wherein:
the frame is decodable by the plurality of wireless nodes of the first type and one or more wireless nodes of a second type, the one or more wireless nodes of the second type not having the first MU communication capability; and
the channel bonding information is interpretable by the plurality of wireless nodes of the first type but not interpretable by the one or more wireless nodes of the second type;
the channel bonding information comprises one or more bits;
different values of the one or more bits map to different combinations of channels of the plurality of channels available for MU communication by the apparatus; and
a number of bits in the one or more bits is based, at least in part, on a channel bandwidth;
use a plurality of bits of the service field for scrambler initialization;
determine, based on the channel bonding information contained in the frame, whether each of the plurality of channels are available for the MU communication, wherein determining the plurality of channels available for MU communication is further based, at least in part, on the one or more bits of the channel bonding information; and
output data for transmission on the one or more of the channels determined to be available for MU communication; and
a memory coupled with the at least one processor.

18. The apparatus of claim 17, wherein the at least one processor is further configured to determine based, at least in part, on the plurality of bits.

19. The apparatus of claim 18, wherein:
each bit of the one or more bits of the channel bonding information corresponds to one or more of the plurality of channels; and
each bit indicates whether or not the corresponding one or more channels are available for the MU communication.

20. The apparatus of claim 17, wherein:
at least one of the plurality of bits of the service field is used as a parity bit; and
the at least one processor is further configured to use the parity bit for detecting errors in the channel bonding information.

21. The apparatus of claim 17, wherein:
the channel bonding information comprises a bitmap; and
the processing system determines, based on each bit in the bitmap, whether a corresponding channel is available for MU communication.

22. The apparatus of claim 17, wherein:
the at least one processor is further configured to obtain at least one of a beacon or a target wakeup time (TWT) element; and
the processing system is configured to determine an assignment of the plurality of channels to the apparatus based on an indication in at least one of the beacon, the TWT element, or the frame, and wherein the indication is valid for an amount of time.

23. The apparatus of claim 17, further comprising a receiver configured to receive the frame, wherein the apparatus is configured as a wireless node.

24. The apparatus of claim 17, wherein the first MU communication capability comprises a downlink MU communication capability.

25. The apparatus of claim 17, wherein the first MU communication capability comprises an uplink MU communication capability.

26. The apparatus of claim 17, wherein the first MU communication capability comprises an Orthogonal Frequency-Divisional Multiple Access (OFDMA) communication capability.

27. The apparatus of claim 17, wherein the first MU communication capability comprises a multiple-input, multiple-output (MIMO) communication capability.

28. A method for wireless communications by an apparatus, comprising:
generating a frame including a service field, the service field including channel bonding information, the channel bonding information indicating whether each of a plurality of channels are available for multi-user (MU) communication by a plurality of wireless nodes of a first type, the plurality of wireless nodes of the first type having a first MU communication capability, wherein:
a plurality of bits of the service field are used by the apparatus for scrambler initialization;
the frame is decodable by the plurality of wireless nodes of the first type and one or more wireless nodes of a second type, the one or more wireless nodes of the second type not having the first MU communication capability;
the channel bonding information is interpretable by the plurality of wireless nodes of the first type but not interpretable by the one or more wireless nodes of the second type;

the channel bonding information comprises one or more bits, wherein different values of the one or more bits map to different combinations of channels of the plurality of channels available for MU communication by the plurality of wireless nodes of the first type; and a number of bits in the one or more bits is based, at least in part, on a channel bandwidth; and outputting the frame for transmission.

29. The method of claim 28, wherein:

each bit of the of the one or more bits of the channel bonding information corresponds to one or more of the plurality of channels; and each bit indicates whether or not the corresponding one or more channels are available for the MU communication.

30. A method for wireless communications by an apparatus, comprising:

obtaining a frame including a service field, the service field including channel bonding information, the channel bonding information indicating whether each of a plurality of channels are available for multi-user (MU) communication by a plurality of wireless nodes of a first type, the a plurality of wireless nodes of the first type having a first MU communication capability, the a plurality of wireless nodes of the first type including the apparatus, wherein:

the frame is decodable by the a plurality of wireless nodes of the first type and one or more wireless nodes of a second type, the one or more wireless nodes of the second type not having the first MU communication capability;

the channel bonding information is interpretable by the a plurality of wireless nodes of the first type but not interpretable by the one or more wireless nodes of the second type;

the channel bonding information comprises one or more bits;

different values of the one or more bits map to different combinations of channels of the plurality of channels available for MU communication by the apparatus; and a number of bits in the one or more bits is based, at least in part, on a channel bandwidth;

determining, based on the channel bonding information contained in the frame, whether each of the plurality of channels are available for the MU communication, wherein determining the plurality of channels available for MU communication is further based, at least in part, on the one or more bits of the channel bonding information; and outputting data for transmission on the one or more of the channels determined to be available for MU communication.

* * * * *